Patented July 10, 1923.

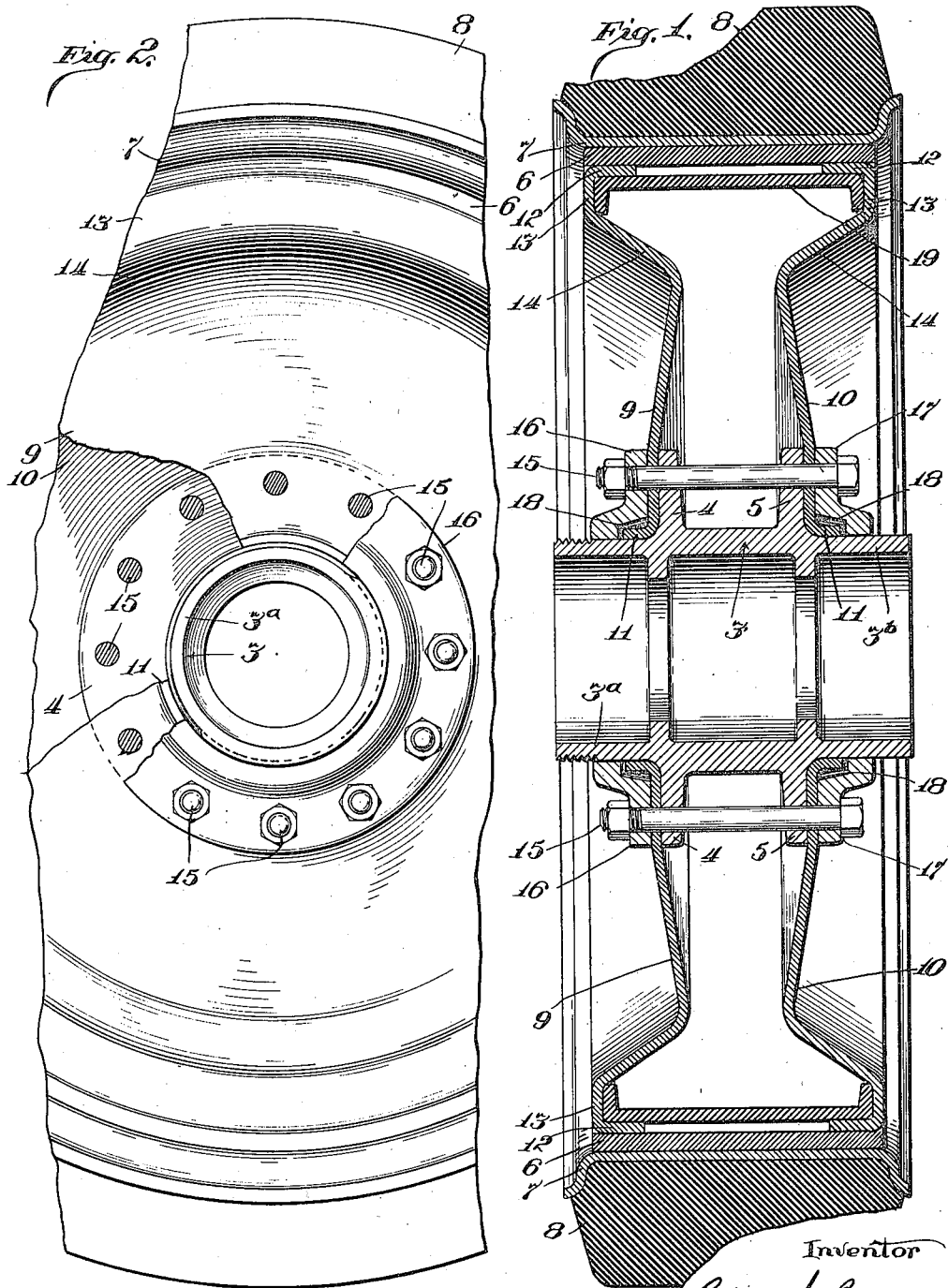

1,461,515

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

METAL WHEEL.

Application filed May 14, 1919. Serial No. 297,101.

*To all whom it may concern:*

Be it known that I, ROBERT J. BURROWS, a citizen of the United States, and a resident of Buchanan, in the county of Berrien and State of Michigan, have invented certain new and useful Improvements in Metal Wheels, of which the following is a specification, reference being had to the accompanying drawings.

My invention relates to metal wheels for trucks and other vehicles, especially self-propelled vehicles designed to carry heavy loads, and has for its object to provide an improved wheel which will be capable of withstanding the rough usage to which such wheels are subjected and yet be comparatively light in weight. To this end I have devised a pressed steel wheel of improved design, the parts of which may be readily assembled, and when assembled cooperate to form a wheel capable of resisting the severe strains to which truck wheels are subjected notwithstanding its comparative lightness, and which will also possess a considerable degree of resiliency against vertical shocks and strains, thereby minimizing the danger of damage to the wheel and the vehicle as well, prolonging the lift of the wheel and tires and reducing fuel consumption. The novel features of my improved wheel are particularly pointed out in the following description thereof in connection with the accompanying drawings, in which—

Fig. 1 is a vertical cross-section of my improved wheel, partly broken away; and Fig. 2 is a partial side elevation thereof, some parts being broken away.

Referring to the drawings,—3 indicates the hub of the wheel which is provided with two substantially parallel peripheral flanges 4—5 disposed at opposite sides of the longitudinal center of the hub and between such center and the ends of the hub so that end portions 3ª—3ᵇ of the hub project beyond said flanges, as shown in Fig. 1. The hub and the flanges 4—5 are an integral casting. 6 indicates the inner rim of the wheel which is a sheet metal band adapted to receive an outer rim 7 of any suitable type which carries a resilient tread 8 of rubber or other suitable material. The outer rim 7 may be secured to the inner rim 6 in any suitable way. 9—10 indicate sheet metal discs which form the side members of the wheel and connect the hub 3 with the inner rim 6. These discs are alike in shape, each being provided at its inner margin with an out-turned flange 11 which is adapted to bear upon the end portion of the hub 3ª or 3ᵇ, when the disc is fitted against the outer face of one of the peripheral flanges 4—5. At their outer margins said discs are provided with in-turned flanges 12 which are adapted to bear against the inner face of the inner rim 6 adjacent to the margins thereof, and be welded or secured thereto in any other suitable manner. Adjacent to the flanges 12 the discs 9—10 are provided with radially-disposed portions 13 and with inwardly-inclined portions 14 which extend to a point somewhat short of the transverse center of the wheel, from which point the inner portions of said discs extend outwardly or away from the transverse center of the wheel to the point where they engage the peripheral flanges 4—5, as clearly shown in Fig. 1, so that the discs are dished in form. Thus I provide a wheel having a hollow or box-like rim structure which is resiliently connected with the hub by reason of the configuration of the discs 9—10. This general type of wheel broadly considered forms the subject-matter of Letters Patent No. 1,131,819, granted to myself and E. B. Ross March 16, 1915.

The discs 9—10 are secured to the flanges 4—5 by means of a series of through-bolts 15 which extend through said discs, through the flanges 4—5, and through collars 16—17 which fit upon the end portions 3ª—3ᵇ of the hub and bear against the outer surfaces of the discs 9—10, so that the bolts 15 serve to bind the discs tightly between the collars 16—17 and the flanges 4—5, respectively. The collars 16—17 are off-set at their inner margins to provide recesses 18 which receive the flanges 11, as shown in Fig. 1, thereby protecting said flanges and to a considerable extent excluding dust and moisture. The discs 9—10 are disconnected from each other intermediately, but between the outer portions of said discs I provide a number of spacers 19, preferably in the form of short channel bar sections, which fit under the flanges 12 and bear against the radial portions 13 of the discs. These spacers brace the outer portions of the discs against lateral shocks, and also reinforce the in-turned flanges 12. They also serve to hold the outer portions of the discs in proper position while the inner rim 6 is being applied thereto, which is preferably accomplished by pressing the rim 6 upon them by an edgewise movement thereof. Preferably I employ about ten of these spacers placed equally distant around the periphery of the wheel.

By the construction described I provide a design which is well adapted for the construction of wide faced wheels such as have been found to be desirable for heavy motor vehicles, as the discs 9—10 may be set as far apart as may be desired without sacrificing the valuable features of the wheel hereinbefore mentioned.

What I claim as my invention and desire to secure by Letters Patent, is—

1. A metal wheel, comprising a hub having peripheral flanges between the ends thereof, metal discs adapted to bear against the outer faces of said flanges and having out-turned flanges adapted to bear upon the hub, said discs being spaced apart from the hub to the periphery of the wheel, separable collars fitted upon the end portions of the hub and bearing against the outer faces of said discs, and means securing said collars to said discs and to said peripheral flanges.

2. A metal wheel, comprising a hub having peripheral flanges between the ends thereof, metal discs adapted to bear against the outer faces of said flanges and having flanges adapted to bear upon the hub, said discs being spaced apart from the hub to the periphery of the wheel, separable collars fitted upon the end portions of the hub and bearing against the outer faces of said discs, spacers between the peripheral portions of said discs and bolts extending through the collars, the discs, and the peripheral flanges.

3. A metal wheel, comprising a hub having peripheral flanges between the ends thereof, metal discs adapted to bear against the outer faces of said flanges and having outturned flanges adapted to bear upon the hub, said discs being spaced apart from the hub to the periphery of the wheel, separable collars fitted upon the end portions of the hub and bearing against the outer faces of said discs, said collars having recesses which receive said outturned flanges, and means securing said collars to said discs and to said peripheral flanges.

4. A metal wheel, comprising a hub having peripheral flanges between the ends thereof, metal discs adapted to bear against the outer faces of said flanges and having in-turned flanges at their peripheries and out-turned flanges adapted to bear upon the hub, said discs being spaced apart from the hub to the periphery of the wheel, separable collars fitted upon the end portions of the hub and bearing against the outer faces of said discs, and bolts extending through the collars, the discs, and the flanges on the hub.

5. A metal wheel, comprising a hub, dished sheet metal discs connected with the hub and having in-turned flanges at their outer margins, radial portions adjacent to said flanges and inwardly-inclined portions extending from said radial portions, forming a box-like rim structure the intermediate portions of said discs being disconnected from each other, a rim secured upon said in-turned flanges, and spacers fitted between the radial portions of said discs.

6. A metal wheel, comprising a hub, dished sheet metal discs connected with the hub and having in-turned flanges at their outer margins, radial portions adjacent to said flanges and inwardly-inclined portions extending from said radial portions, forming a box-like rim structure the intermediate portions of said discs being disconnected from each other, a rim secured upon said inturned flanges, and spacers fitted between the radial portions of said discs and bearing against said in-turned flanges.

7. A metal wheel, comprising a hub, sheet metal discs connected with the hub and having in-turned flanges at their outer margins, radial portions adjacent to said flanges and inwardly-inclined portions extending from said radial portions, forming a box-like rim structure, a rim secured upon said inturned flanges, and channel bar sections fitted between the radial portions of said discs.

8. A metal wheel, comprising a hub having peripheral flanges intermediate the ends thereof, dished metal discs adapted to fit against the outer faces of said flanges and having flanges adapted to bear upon the hub, in-turned flanges at the outer margins of said discs the intermediate portions of said discs being disconnected from each other, a rim secured to said in-turned flanges, said discs having radial portions adjacent to said in-turned flanges and inwardly-inclined portions extending from said radial portions, forming a box-like rim structure, and spacers fitted between the radial portions of said discs.

9. A metal wheel, comprising a hub having peripheral flanges between the ends thereof, metal discs adapted to fit against the outer faces of said flanges and having out-turned flanges adapted to bear upon the hub, inturned flanges at the outer margins of said discs, a rim secured to said in-turned flanges, said discs having radial portions adjacent to said in-turned flanges and inwardly-inclined portions extending from said radial portions, forming a box-like rim structure, separable collars fitted upon the end portions of the hub and bearing against the outer faces of said discs, said collars having recesses which receive said out-turned flanges and means securing said collars to said discs and to said peripheral flanges.

10. A metal wheel, comprising a hub having peripheral flanges intermediate the ends thereof, metal discs adapted to fit against the outer faces of said flanges and having flanges adapted to bear upon the hub, in-turned flanges at the outer margins of said discs, a rim secured to said inturned flanges, said discs having radial portions adjacent to said in-turned flanges and inwardly-inclined portions extending from said radial portions, forming a box-like rim structure, separable collars fitted upon the end portions of the hub and bearing against the outer faces of said discs, means securing said collars to said discs and to said peripheral flanges, and spacers fitted between the radial portions of said discs.

11. A sheet metal wheel comprising a hub, a pair of separated discs mounted on the hub, the intermediate portions of said discs being disconnected from each other, a rim seated on the peripheries of said discs, and a plurality of reinforcing metal pieces located between said discs adjacent to the rim.

12. A sheet metal wheel comprising a hub, a pair of separated discs mounted on the hub and having in-turned peripheral flanges, the intermediate portions of said discs being disconnected from each other, a rim seated on said flanges, and a plurality of reinforcing metal pieces located between said discs adjacent to the rim.

13. A sheet metal wheel comprising a hub, a pair of separated discs mounted on the hub and having in-turned peripheral flanges, the intermediate portions of said discs being disconnected from each other, a rim seated on said flanges, and a plurality of reinforcing metal pieces located between said discs adjacent to the rim and underlying said flanges.

14. A sheet metal wheel comprising a hub, a pair of separated discs mounted on the hub and having in-turned peripheral flanges, the intermediate portions of said discs being disconnected from each other, a rim seated on said flanges, and a plurality of channel bar spacers located between said discs adjacent to the rim and underlying said flanges.

ROBERT J. BURROWS.